United States Patent
Ayyagari et al.

(10) Patent No.: US 8,917,626 B2
(45) Date of Patent: Dec. 23, 2014

(54) SYSTEM AND METHOD FOR MANAGING INTERNETWORK COMMUNICATIONS AMONG A PLURALITY OF NETWORKS

(75) Inventors: Arun Ayyagari, Seattle, WA (US); Brian James Smith, Seattle, WA (US); Michael A. Dorsett, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 692 days.

(21) Appl. No.: 12/505,323

(22) Filed: Jul. 17, 2009

(65) Prior Publication Data

US 2011/0013539 A1   Jan. 20, 2011

(51) Int. Cl.
*H04J 1/16* (2006.01)
*H04L 12/715* (2013.01)
*H04L 12/781* (2013.01)
*H04L 12/66* (2006.01)

(52) U.S. Cl.
CPC ............... *H04L 12/66* (2013.01); *H04L 45/64* (2013.01); *H04L 45/52* (2013.01)
USPC ............................ 370/254; 370/315; 370/401

(58) Field of Classification Search
USPC .......... 370/252, 254, 395.5, 395.52, 400, 401
See application file for complete search history.

(56) References Cited

U.S. PATENT DOCUMENTS

| | | | |
|---|---|---|---|
| 7,782,882 B2 * | 8/2010 | Qureshi et al. ............. | 370/401 |
| 7,904,711 B2 * | 3/2011 | Mackey et al. ............ | 713/151 |
| 7,929,458 B1 * | 4/2011 | Hoech et al. ............... | 370/254 |
| 8,014,371 B1 * | 9/2011 | Miller et al. ............... | 370/338 |
| 8,200,789 B2 * | 6/2012 | Boutboul et al. ........... | 709/220 |
| 8,363,663 B2 * | 1/2013 | Smith et al. ................ | 370/401 |
| 8,509,245 B1 * | 8/2013 | Kim et al. .................. | 370/400 |
| 8,514,698 B2 * | 8/2013 | Donhauser et al. ......... | 370/229 |
| 2003/0199266 A1 | 10/2003 | Zavidniak | |
| 2008/0291843 A1 * | 11/2008 | Sonnenberg et al. ....... | 370/254 |
| 2009/0073994 A1 * | 3/2009 | Qureshi et al. ............ | 370/401 |
| 2009/0168760 A1 | 7/2009 | Katis et al. | |

OTHER PUBLICATIONS

"Global Information Grid (GIG) Edge Network Interface Architecture", M. Albuquerque, A. Ayyagari, M. A. Dorsett, M. S Foster, Miliary Communications Conference, 2007, MILCOM2007, Oct. 29-31, 2007, pp. 1-7.*
Marcelo Albuquerque, et al.; "Global Information Grid (GIG) Edge Network Interface Architecture"; Military Communications Conference 2007; MILCOM 2007, IEEE; Picscataway, NJ, Oct. 29, 2007; pp. 1-7.

(Continued)

*Primary Examiner* — Brian O'Connor
(74) *Attorney, Agent, or Firm* — Armstrong Teasdale LLP

(57) ABSTRACT

A system for managing internetwork communications among a plurality of networks includes: (a) a plurality of edge network nodes; each respective edge network node being coupled to manage internetwork communications between a respective own network and other networks of the plurality of networks than the respective own network; and (b) at least one gateway-capable edge network node communicatingly coupled with each respective network node. Each respective edge network node includes a native communication network management unit for managing communications by the respective edge network node using a native communication protocol. Each respective edge network node includes an overlay communication network management unit for managing communications by the respective edge network node using an overlay communication protocol.

18 Claims, 7 Drawing Sheets

(56) References Cited

OTHER PUBLICATIONS

Farroha, B.S.,et al.; "Requirements and Architectural Analysis for Precedence Capabilities in the Global Information Grid"; Military Communications Conference 2006; MILCOM 2006, IEEE; Oct. 23, 2006; pp. 1-7.

Extended European Search Report re: Applic. No. 10250943.7 of Nov. 8, 2010.
The Boeing Company; Dynamic Information Management Air to Ground (DIMAG), Final Report; Sep. 30, 2008.

* cited by examiner

SYSTEM AND METHOD FOR MANAGING INTERNETWORK COMMUNICATIONS AMONG A PLURALITY OF NETWORKS

TECHNICAL FIELD

The present invention is directed to managing internetwork communications among a plurality of networks.

BACKGROUND

Tactical networks may be embodied in nodes built on platforms that may be created or activated in a dynamic and ad-hoc manner. Source and destination nodes communicating with each other may reside on tactical networks with the same or different networking waveforms. Networking waveforms may include a plurality of communicating parameters including, by way of example and not by way of limitation, communication message format, signaling protocol, message addressing, handshake protocols and other aspects of communicating among networks. A communication venue may include numerous tactical networks employing different communicating waveforms. Such a communicating environment may be referred to as including heterogeneous tactical networks.

When source and destination nodes belong to tactical networks employing different networking waveforms, data communication between peer applications and services residing at the source and destination nodes may communicate with each other via multi-hop employment of a plurality of tactical networks including at least one gateway that may provide interconnectivity between pairs of heterogeneous tactical networks. Tactical networking environments may have various constraints and a multi-hop tactical network system preferably must robustly handle intermittent link connectivity, varying forward and return path-route bandwidth and bit-packet errors or rates, and may preferably operate over heterogeneous tactical networks consisting of both Internet Protocol (IP) and non-IP networks.

In addition to providing seamless interconnection within a system including heterogeneous tactical networks with different networking waveforms, it would be desirable to be able to connect with ex-system networks such as, by way of example and not by way of limitation, the Internet or the Global Information Grid (GIG).

A challenge for operating within multi-hop heterogeneous tactical networks is to define the path or route between peer nodes and their associated applications or services that take into account the varying and asymmetric link connectivity characteristics between adjacent network nodes while ensuring end-to-end connectivity at a desired Quality of Service (QoS) for critical information management (IM) and message exchanges.

Existing solutions to address end-to-end connectivity at the desired QoS for mission critical IM within multi-hop heterogeneous tactical networks may rely on, by way of example and not by way of limitation: (1) Mechanisms such as the Internet's reliable delivery implemented by Transmission Control Protocol/Internet Protocol (TCP/IP), which may achieve reliability by source retransmissions to destination nodes; (2) Some source node applications or services may rely on multiple redundant transmissions to ensure that at least probabilistically one of the redundant transmissions may be received by the destination node's applications or services; and (3) Use of a pair of Performance Enhancing Proxy (PEP) gateways between tactical networking regions where connectivity performance does not meet critical requirements. Peer PEP gateways may rely on transport mechanisms, such as transmission rate control, retransmission, and error correction coding, to enhance message or packet delivery performance between peer PEP gateways to enhance end-to-end connectivity.

Disadvantages of the existing solutions may include, by way of example and not by way of limitation: (1) TCP/IP may provide end-to-end connectivity reliability but the mechanism was intended for congestion control and hence in the case of paths or routes consisting of links that encounter intermittent disruptions (i.e., tactical networks) the congestion control mechanism of TCP/IP results in reduced end-to-end throughput performance. Further, tactical networks may involve heterogeneous waveforms and TCP/IP may not fully address predefined end-to-end message or packet delivery requirements. (2) Use of redundant transmissions between source and destination nodes' applications or services to enhance the probability of end-to-end message or packet delivery may adversely impact utilization of the resource- or bandwidth-constrained tactical networks because transmission of redundant messages or packets may require additional networking resources. (3) Use of PEP gateways may require planned deployment so may therefore not apply well within a dynamic multi-hop tactical networking environment. Further, PEP gateways may be prone to experiencing a single point of failure.

There is a need for a system and method for managing internetwork communications among a plurality of networks that enables effective selection and establishment of paths or routes appropriate to meet requirements for successful and timely end-to-end data transfer within multi-hop tactical (e.g., IP and non-IP) networks.

There is a need for a system and method for managing internetwork communications among a plurality of networks that may enhance robustness of a system of heterogeneous tactical networks to satisfy communication link performance characteristics that may be expressed in terms of Quality of Service (QoS) parameters.

SUMMARY

A system for managing internetwork communications among a plurality of networks includes: (a) a plurality of edge network nodes; each respective edge network node being coupled to manage internetwork communications between a respective own network and other networks of the plurality of networks than the respective own network; and (b) at least one gateway-capable edge network node communicatingly coupled with each respective network node. Each respective edge network node includes a native communication network management unit for managing communications by the respective edge network node using a native communication protocol. Each respective edge network node includes an overlay communication network management unit for managing communications by the respective edge network node using an overlay communication protocol.

A method for managing internetwork communications among a plurality of networks includes: (a) in no particular order: (1) providing a plurality of edge network nodes; each respective edge network node including a native communication network management unit for managing communications by the respective edge network node using a native communication protocol; each respective edge network node including an overlay communication network management unit for managing communications by the respective edge network node using an overlay communication protocol; and (2) providing at least one gateway-capable edge network node; (b) coupling each respective edge network node of the plurality of edge network nodes to manage the internetwork communications between a respective own network and other networks of the plurality of networks than the respective own network; and (c) communicatingly coupling the at least one gateway-capable edge network node with each respective network node of the plurality of edge network nodes.

It is, therefore, a feature of the present disclosure to provide a system and method for managing internetwork communications among a plurality of networks that enables effective selection and establishment of paths or routes appropriate to meet requirements for successful and timely end-to-end data transfer within multi-hop tactical (e.g., IP and non-IP) networks.

It is another feature of the present disclosure to provide a system and method for managing internetwork communications among a plurality of networks that may enhance robustness of a system of heterogeneous tactical networks to satisfy communication link performance characteristics that may be expressed in terms of Quality of Service (QoS) parameters.

Further features of the present disclosure will be apparent from the following specification and claims when considered in connection with the accompanying drawings, in which like elements are labeled using like reference numerals in the various figures, illustrating the preferred embodiments of the disclosure.

BRIEF DESCRIPTION OF THE DRAWINGS

FIG. 7 is a flow chart illustrating certain relationships among FIGS. 4-6.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g., as in a cause and effect relationship).

Figure 1:
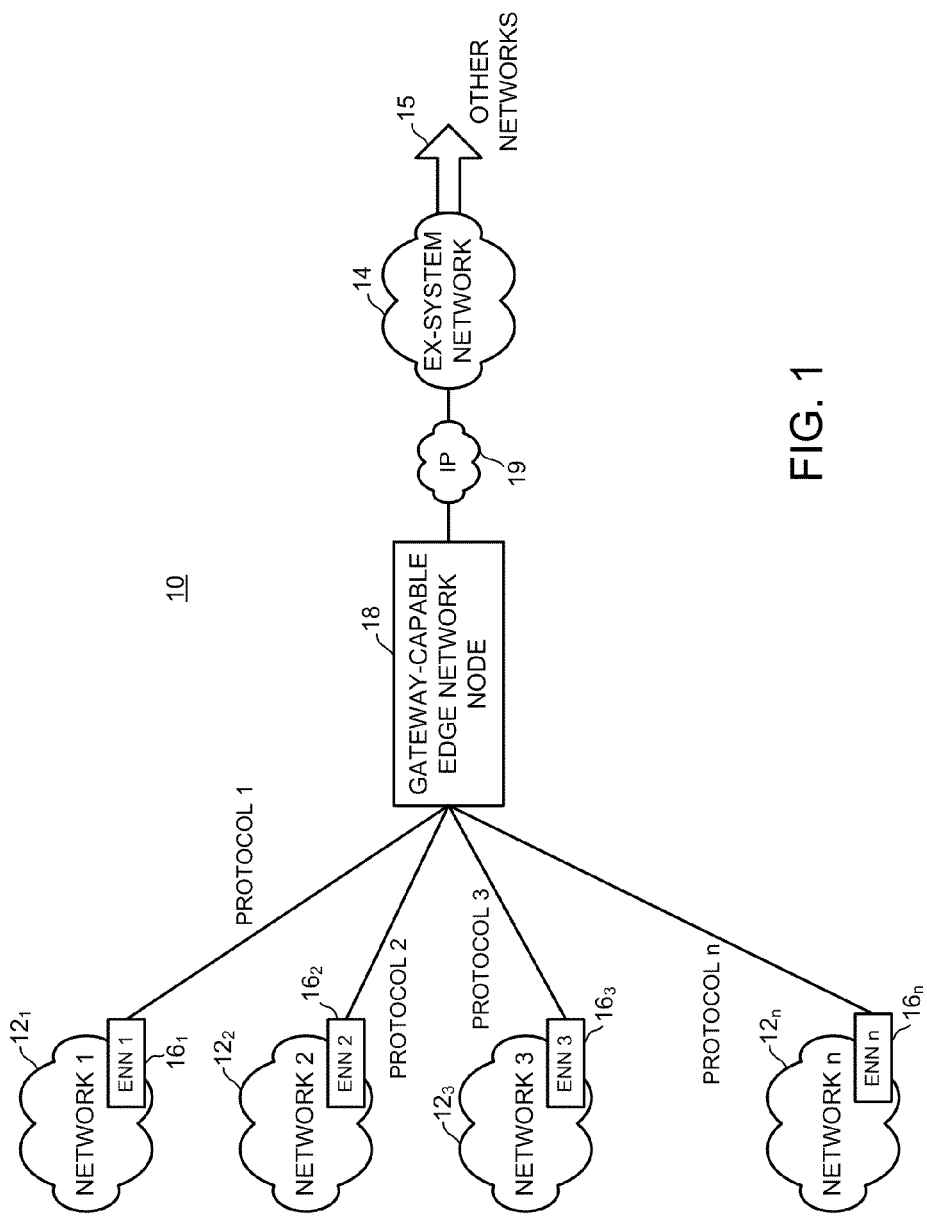
FIG. 1 is a schematic diagram of a multi-hop heterogeneous tactical network system configured according to the teachings of the present disclosure.

FIG. 1 is a schematic diagram of a multi-hop heterogeneous tactical network system configured according to the teachings of the present disclosure. In FIG. 1, a communication system 10 may be configured for effecting communication management among a plurality of networks $12_1$, $12_2$, $12_3$, $12_n$. An ex-system network 14 may also be coupled with system 10. The indicator "n" is employed to signify that there can be any number of networks in communication system 10. The inclusion of four networks $12_1$, $12_2$, $12_3$, $12_n$ in FIG. 1 is illustrative only and does not constitute any limitation regarding the number of networks that may be included in the communication system of the present invention. Throughout this description, use of a reference numeral using a generic subscript herein may be taken to mean that any respective member of the plurality of elements having the same reference numeral may be regarded as included in the description. Thus, by way of example and not by way of limitation, referring to network $12_n$ in describing FIG. 1 may be taken to mean that any network—$12_1$, $12_2$, $12_3$ or $12_n$ (FIG. 1)—may be regarded as capable of employment as described.

Each respective network $12_n$ may be configured with an edge network node (ENN) for managing communications outside each respective network $12_n$. Network $12_1$ may be configured with an edge network node ENN1, and may be referred to here as element $16_1$. Network $12_2$ may be configured with an edge network node ENN2, and may be referred to here as element $16_2$. Network $12_3$ may be configured with an edge network node ENN3, and may be referred to here as element $16_3$. Network $12_n$ may be configured with an edge network node ENNn, and may be referred to here as element $16_n$. There may be more than one edge network node associated with a given network $12_n$. By way of example and not by way of limitation, a network $12_n$ may have one or more edge network node $16_n$ for connecting with gateway-capable edge network node 18 for purposes of load balancing, redundancy or for another reason. Only one edge network node $16_n$ is associated with each respective network $12_n$ in FIG. 1 in order to simplify explanation of the present disclosure.

System 10 may also include a gateway-capable edge network node 18. Gateway-capable edge network node 18 may be coupled with each network $12_n$ via a respective edge network node $16_n$. Each edge network node $16_n$ may communicate with gateway-capable edge network node 18 using a different respective communication protocol or waveform. Edge network node $16_1$ may communicate with gateway-capable edge network node 18 using a communication protocol 1. Edge network node $16_2$ may communicate with gateway-capable edge network node 18 using a communication protocol 2. Edge network node $16_3$ may communicate with gateway-capable edge network node 18 using a communication protocol 3. Edge network node $16_n$ may communicate with gateway-capable edge network node 18 using a communication protocol n.

Gateway-capable edge network node 18 may be coupled with ex-system network 14 via a network 19 using a communication protocol compatible with both gateway-capable edge network node 18 and ex-system network 14 such as, by way of example and not by way of limitation, an Internet Protocol (IP) for communication with entities within ex-system network 14 or for communication with other networks coupled with ex-system network 14 (not shown in FIG. 1) as indicated by an arrow 15.

Figure 2:
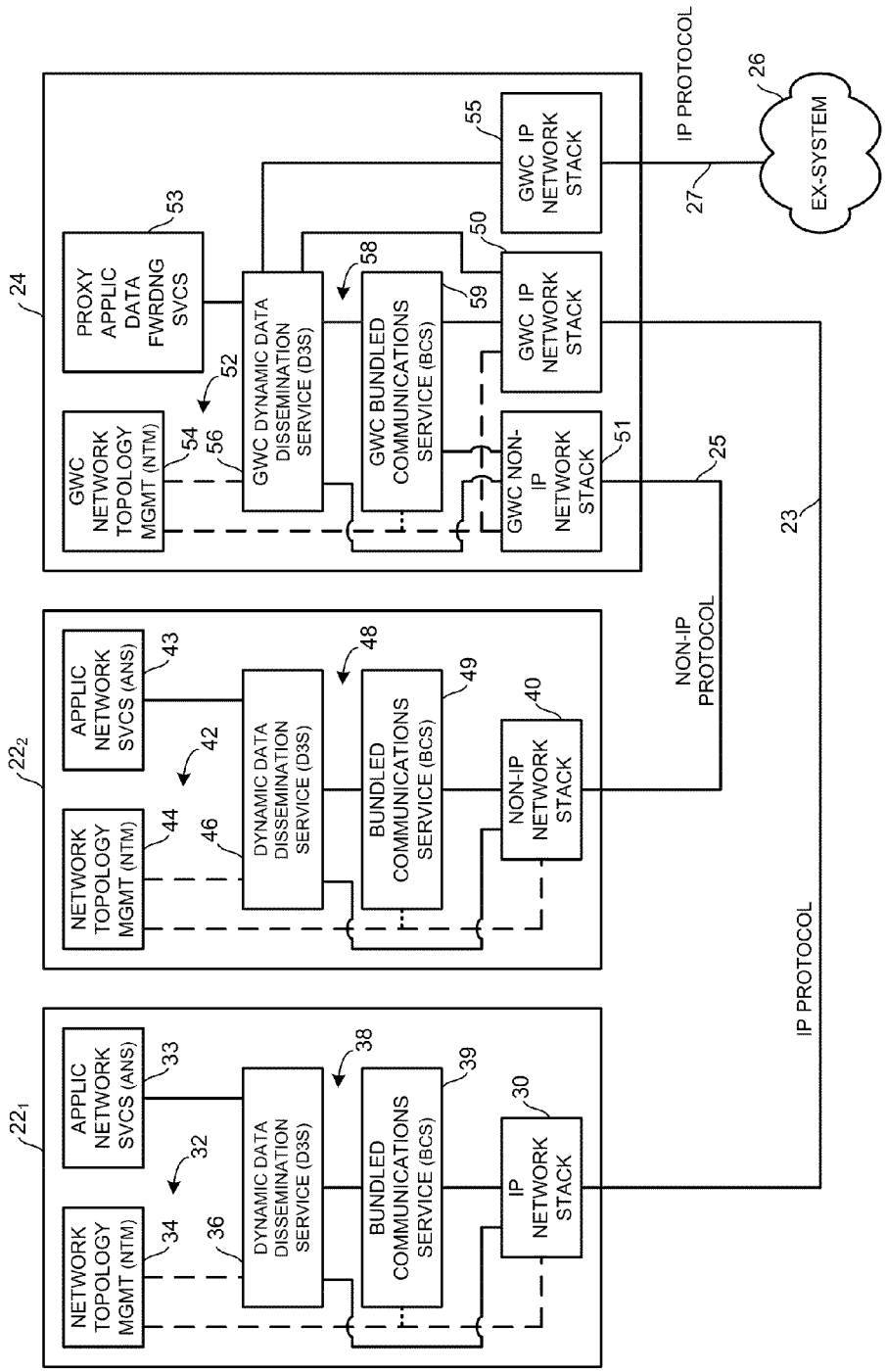
FIG. 2 is a schematic diagram illustrating details of the tactical network system illustrated in FIG. 1.

FIG. 2 is a schematic diagram illustrating details of the tactical network system illustrated in FIG. 1. In FIG. 2, a communication system 20 may be configured for effecting communication management among a plurality of networks (not shown in FIG. 2). Each respective network may be configured with an edge network node $22_1$, $22_2$ for managing communications outside each respective network.

System 20 may also include a gateway-capable edge network node 24. Gateway-capable edge network node 24 may be coupled with each network via a respective edge network node $22_1$, $22_2$. Each edge network node $22_1$, $22_2$ may communicate with gateway-capable edge network node 24 using a different respective communication protocol or waveform. Edge network node $22_1$ may communicate with gateway-capable edge network node 24, by way of example and not by way of limitation, using an Internet Protocol (IP). Edge network node $22_2$ may communicate with gateway-capable edge network node 24, by way of example and not by way of limitation, using a non-IP protocol.

Gateway-capable edge network node 24 may be coupled with an ex-system network 26 via a network (not shown in FIG. 2; see FIG. 1) using a communication protocol compatible with both gateway-capable edge network node 24 and ex-system network 26 such as, by way of example and not by way of limitation, an Internet Protocol (IP) for communication with entities within ex-system network 26 or for communication with other networks coupled with ex-system network 26 (not shown in FIG. 2).

Edge network node $22_1$ may include a native protocol unit embodied in an IP network stack 30. IP network stack 30 may be coupled with gateway-capable edge network node 24. IP network stack 30 may be coupled with a network topology management element 32. Network topology management element 32 may be embodied in a Network Topology Management (NTM) unit 34 that may cooperate with a dynamic data dissemination unit embodied in a Dynamic Data Dissemination Service (D3S) unit 36 to manage topological aspects of communication by edge network node $22_1$ using a native communication protocol. Native communication protocol for edge network node $22_1$ may be an IP communication protocol because edge network node $22_1$ communicates with gateway-capable edge network node 24 using an IP communications protocol.

Edge network node $22_1$ may also include an overlay network management unit 38. Overlay network management unit 38 may be embodied in a Bundled Communication Service (BCS) unit 39 that may cooperate with D3S unit 36 to manage overlay network communication operations by edge network node $22_1$ using at least one overlay communication protocol. Overlay communication protocol for edge network node $22_1$ may be a communication protocol related to a specialized application involving communications routed via edge network node $22_1$ or may be another communication protocol employed by edge network node $22_1$ instead of or in conjunction with the native communication protocol of edge network node $22_1$.

Edge network node $22_1$ may further include a node-specific Application Network Services (ANS) unit 33 coupled with D3S unit 36. ANS unit 33 may operate in cooperation with D3S unit 36 to manage communications specific to at least one particular application operated by edge network node $22_1$.

Edge network node $22_2$ may include a native protocol unit embodied in an IP network stack 40. IP network stack 40 may be coupled with gateway-capable edge network node 24. IP network stack 40 may be coupled with a network topology management element 42. Network topology management element 42 may be embodied in a Network Topology Management (NTM) unit 44 that may cooperate with a dynamic data dissemination unit embodied in a Dynamic Data Dissemination Service (D3S) unit 46 to manage topological aspects of communication by edge network node $22_2$ using a native communication protocol. Native communication protocol for edge network node $22_2$ may be a non-IP communication protocol because edge network node $22_2$ communicates with gateway-capable edge network node 24 using a non-IP communications protocol.

Edge network node $22_2$ may also include an overlay network management unit 48. Overlay network management unit 48 may be embodied in a Bundled Communication Service (BCS) unit 49 that may cooperate with D3S unit 46 to manage overlay network communication operations by edge network node $22_2$ using at least one overlay communication protocol. Overlay communication protocol for edge network node $22_2$ may be a communication protocol related to a specialized application involving communications routed via edge network node $22_2$ or may be another communication protocol employed by edge network node $22_2$ instead of or in conjunction with the native communication protocol of edge network node $22_2$.

Edge network node $22_2$ may further include a node-specific Application Network Services (ANS) unit 43 coupled with D3S unit 46. ANS unit 43 may operate in cooperation with D3S unit 46 to manage communications specific to at least one particular application operated by edge network node $22_2$.

Gateway capable edge network node 24 may include a gateway-capable native protocol unit embodied in a gateway-capable (GWC) IP network stack 50. GWC IP network stack 50 may be coupled with edge network node $22_1$ via communication line 23 for communications employing an IP communication protocol. GWC IP network stack 50 may be coupled with a gateway-capable (GWC) network topology management element 52. GWC network topology management element 52 may be embodied in a gateway-capable (GWC) Network Topology Management (NTM) unit 54 that may cooperate with a dynamic data dissemination unit embodied in a gateway-capable (GWC) Dynamic Data Dissemination Service (D3S) unit 56 to manage topological aspects of communication by gateway-capable edge network node 24 using a native communication protocol. Native communication protocol for gateway-capable edge network node 24 may be selected as a common protocol for use within gateway-capable edge network node, such as, by way of example and not by way of limitation, an IP communication protocol.

Gateway capable edge network node 24 may also include a gateway-capable native protocol unit embodied in a gateway-capable (GWC) non-IP network stack 51. GWC non-IP network stack 51 may be coupled with edge network node $22_2$ via communication line 25 for communications employing a non-IP communication protocol. GWC non-IP network stack 51 may be coupled with GWC network topology management element 52 embodied in GWC NTM unit 54 cooperating with GWC D3S unit 56 to manage topological aspects of communication by gateway-capable edge network node 24 using a native communication protocol. GWC network topology management element 52 may convert or translate non-IP protocol communications received at GWC non-IP network stack 51 into IP protocol communications. IP protocol communications may be the native communication protocol for gateway-capable edge network node 24 and may be employed as a common protocol for use within gateway-capable edge network node 24.

Gateway-capable edge network node 24 may also include a gateway-capable (GWC) overlay network management unit 58. GWC overlay network management unit 58 may be embodied in a gateway-capable (GWC) Bundled Communication Service (BCS) unit 59 that may cooperate with GWC D3S unit 56 to manage overlay network communication operations by edge network node 24 using at least one overlay communication protocol. Overlay communication protocol for gateway-capable edge network node 24 may be a communication protocol related to a specialized application involving communications routed via gateway-capable edge network node 24 or may be another communication protocol employed by gateway-capable edge network node 24 instead of or in conjunction with the native communication protocol of gateway-capable edge network node 24.

Gateway-capable edge network node 24 may further include a node-specific gateway-capable (GWC) Proxy Application Data Forwarding Service unit 53 coupled with GWC D3S unit 56. GWC Proxy Application Data Forwarding Services unit 53 may operate in cooperation with GWC D3S unit 56 to manage communications specific to at least one particular application operated by gateway-capable edge network node 24.

Gateway-capable edge network node 24 may still further include a second GWC IP network stack 55 coupled with GWC D3S 56 to effect communications via a communication line 27 with ex-system 26 using an IP communication protocol.

The architecture and design of system 20 may permit robust tactical network facilitates establishment and selection of path or route between a source node or locus in a first network and a destination node or locus in a second network. System 20 may further permit establishment and selection of associated applications or services that ensure end-to-end connectivity at a desired Quality of Service (QoS) level while accounting for selected characteristics of communication link performance within a dynamic heterogeneous tactical networking environment. The term "heterogeneous" may be employed herein to indicate that various networks communicate using different native communication protocols such as, by way of example and not by way of limitation, IP and non-IP communication protocols.

FIG. 2 may illustrate a robust multi-hop heterogeneous tactical network system architecture 20. In system 20, tactical or edge networks may employ both IP and non-IP communication protocols that may use different networking waveforms. By way of example and not by way of limitation, communication link physical and link layer protocols of the tactical networks may differ.

When source and destination nodes employ different networking waveforms, the source and destination tactical networks may need to be interconnected via gateway-capable edge network node 24. Gateway-capable edge network node 24 may permit defining hierarchical layout of tactical networks by their deployment characteristics, such as their geographical layout, allowing for the scaling of the system architecture to large numbers of nodes and tactical networks. Using tactical gateway elements such as gateway-capable edge network node 24 may permit creation of multiple overlay networking regions allowing for the development of a namespace that maps and scales to hierarchical deployment by easing the path or route establishment and selection processes.

Gateway-capable edge network node 24 may permit separation of ex-system networks 26 (i.e., networks outside of communication system 20) from the tactical networks. Separating tactical networks from ex-system networks 26 may facilitate selection and establishment of paths or routes to tactical regions. Edge network nodes 22₁, 22₂ and gateway-capable edge network node 24 preferably include substantially common infrastructure elements—Network Topology Management (NTM) units 34, 44, 54; Dynamic Data Dissemination Service (D3S) unit 36, 46, 56; and Bundled Communication Service (BCS) units 39, 49, 59 in addition to node-specific Application Network Services units 33, 43 and GWC Proxy Application Data Forwarding Services unit 53.

Each respective NTM unit 34, 44 located on each edge network node $22_1$, $22_2$ may maintain a map of the tactical or edge network topology to which each respective NTM unit 34, 44 belongs and characteristics of communication performance for all the links on the native network associated with the given tactical network, and may support the required behavior of managing tactical network node (e.g., edge network nodes $22_1$, $22_2$) activities including negotiations for path or route information, attainment of required Quality of Service (QoS) levels and establishment and selection of path or route within the particular tactical network for both native and overlay networking. Network topology information may be obtained through discovery mechanisms that detect external nodes in a particular tactical network either via a distributed node discovery mechanism in the native networking protocol stack or in combination with a designated node, such as a tactical gateway node (e.g., gateway-capable edge network node 24), that compiles and disseminates the topology information to all nodes associated with the particular tactical network. The distributed NTM unit architecture employed in the present disclosure may provide an ability of self-emergent and dynamic behavior for awareness of network topology, characteristics of communication performance for all links, and maintaining connectivity via the establishment and selection of both native and overlay networking paths or routes between pairs of nodes $22_1$, $22_2$, 24 for a dynamically changing tactical network.

Employing a D3S unit 36, 46 within each node $22_1$, $22_2$ may provide network-aware, robust end-to-end connectivity for information management and exchanges by interacting with underlying native and overlay networking layers. D3S units 36, 46 may cooperate with NTM units 34, 44 to determine a network path to be used for a particular end-to-end connectivity between source and destination nodes and their associated applications or services. Within a given tactical network, network path selection may employ either native or overlay networking. D3S units 36, 46 may interface with NTM units 34, 44 to determine whether native or overlay networking path or route needs to be taken based on the communication performance differences between forward and return links between node pairs and based on end-to-end connectivity requirements. Based on a destination node address each NTM unit 34, 44 may determine whether a destination node is within its respective tactical network or within another network such as, by way of example and not by way of limitation, another tactical network or an ex-system network 26 such as the Internet or a GIG-connected network. If the destination node is within another network, a D3S unit 36, 46 may achieve robustness and scalability by a form of late binding that may be effected by forwarding the session to a peer D3S unit 56 within a tactical gateway such as, by way of example and not by way of limitation, gateway-capable edge network node 24. D3S unit 56 in gateway-capable edge network node 24 may in turn forward the session to a peer D3S unit 36, 46 in a destination node. In such an arrangement, an NTM unit 34, 44, 54 may determine and forward to a peer D3S unit 36, 46 in a destination node the address of gateway-capable edge network node 24 to which the source node D3S unit 36, 46 may forward the session. If the destination node is within the same tactical network, D3S unit 36, 46 may forward the session to a peer D3S unit 36, 46 in the destination node. In any case, the source node D3S unit 36, 46 may query an NTM unit 34, 44 in a source node to determine whether forwarding of the session to the destination node or the tactical gateway (e.g., gateway-capable edge network node 24) should use the native or overlay networking. Based on the response to the query, D3S unit 36, 46 may forward the session over the networking path or route specified by NTM unit 34, 44. Similarly, D3S unit 56 on the tactical gateway (e.g., gateway-capable edge network node 24) may query NTM unit 34, 44 in an edge network node 22$_1$, 22$_2$ to determine whether forwarding of the session to the destination node should use the native or overlay networking. Based on the response to the query, D3S unit 56 on gateway-capable edge network node 24 may forward the session over an NTM unit 34, 44 specified network path or route.

Splitting of the session at gateway-capable edge network node 24 to destination nodes belonging to another ex-system network 26 may permit selection of either a native or an overlay networking path or route within each ex-system network 26 that best meets the end-to-end connectivity requirements for critical Information Management (IM) and communication exchanges. D3S unit 34, 44 may also provide service as an Application Program Interface (API) to enable Application Network Services (ANS) units 33, 43 to communicate with peer Application Network Services on another edge network node 22$_1$, 22$_2$.

BCS units 39, 49 may be located in a tactical node 22$_1$, 22$_2$ above the native networking stack 30, 40 and below the D3S unit 36, 46 and may provide overlay networking functionality. BCS units 39, 49 may, by way of example and not by way of limitation, leverage a Delay-Tolerant Networking (DTN) protocol and associated protocols to provide reliable end-to-end communications in the face of network partitioning and intermittent disruptions. By way of example and not by way of limitation, such an employment of BCS units 34, 44 may occur when a contemporaneous end-to-end path between a source and a destination may not exist within an overlay networking framework. BCS units 34, 44 may provide custody-based reliability for end-to-end communications among heterogeneous environments via DTN-based overlay networking that runs over heterogeneous tactical networks. Based on the end-to-end connectivity requirements and communication link performance between node pairs NTM units 34, 44 may determine and configure DTN links and path or route between source and destination nodes for overlay networking. A DTN-based BCAS unit 39, 49 may permit transmission of information bundles between source and destination nodes while enhancing reliability and timely delivery of critical IM and communication exchanges while minimizing dependency on communication link performance of a native network.

Because NTM units 34, 44 located on each node may maintain a map of its respective tactical or edge network topology and characteristics of communication performance for all the links on the native network associated with the given tactical network, an NTM unit 34, 44 within each edge network node 22$_1$, 22$_2$ may determine the paths or routes for all the nodes using native networking. Such a distributed arrangement for path or route establishment, using algorithms such as, by way of example and not by way of limitation, Dijkstra Open Shortest Path First (OSPF) at each NTM unit 34, 44 may allow determination of paths or routes that need to be configured within a respective node for native networking interfaces. Distributed path or route computation using link state protocols may be extended to a BCS unit 34, 44 overlay network within each edge network node 22$_1$, 22$_2$ in a given tactical network.

Figure 3:
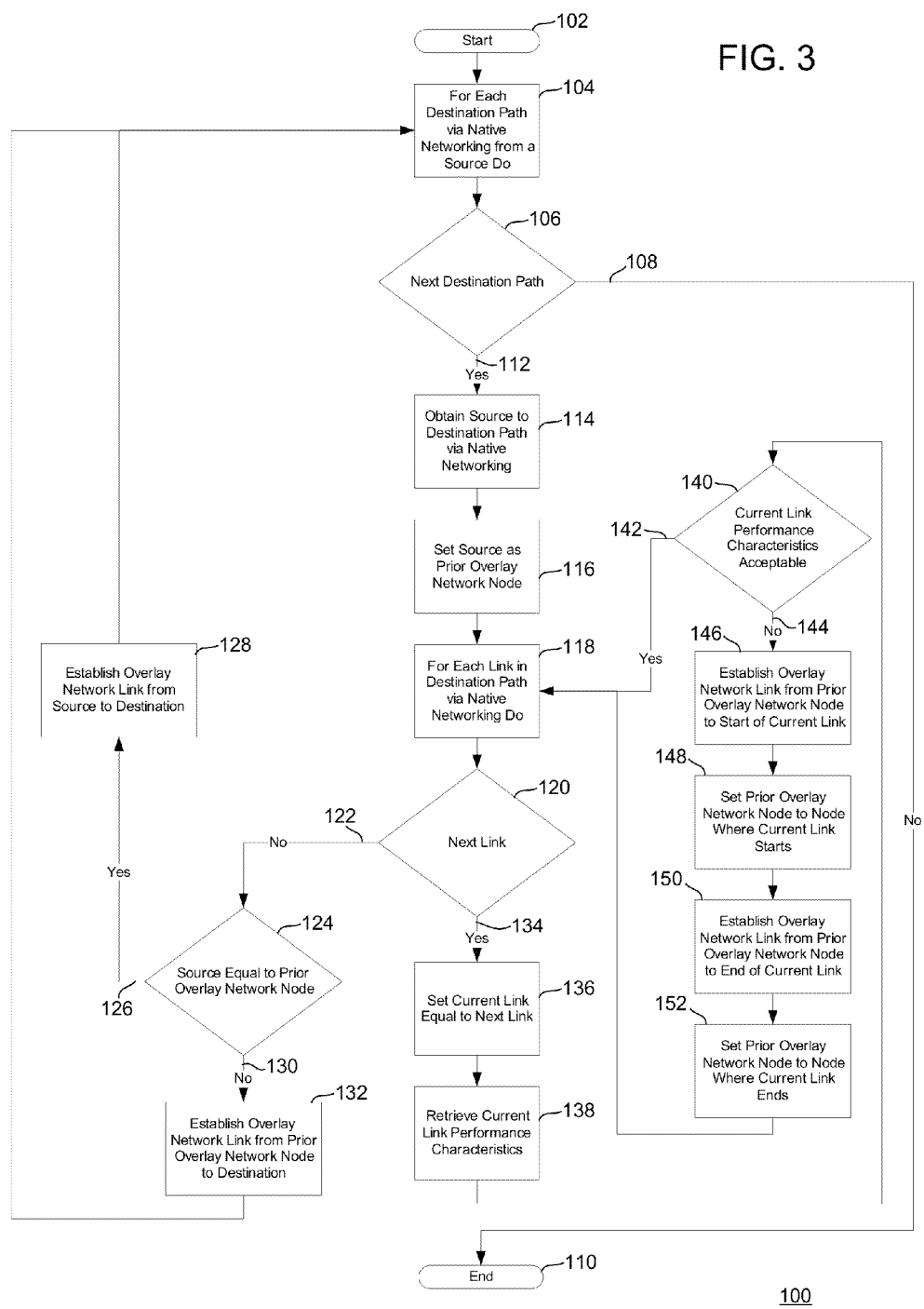
FIG. 3 is a flow chart illustrating a method for establishing an overlay network link.

FIG. 3 is a flow chart illustrating a method for establishing an overlay network link. In FIG. 3, a method 100 for establishing an overlay network link 100 may begin at a START locus 102. Method 100 may continue as illustrated in FIG. 3, for each destination path, via a native networking from a source within a served network (e.g., a network 12$_n$; FIG. 1) of a communication system (e.g., communication system 10; FIG. 1): posing a query whether there is a next destination path, as indicated by a query block 106. If there is not a next destination path, method 100 may continue from query block 106 via a NO response line 108 to an END locus 110, and method 100 may terminate. If there is a next destination path, method 100 may continue from query block 106 via a YES response line 112 to obtain a source-to-destination path via native networking, as indicated by a block 114.

Method 100 may continue with setting the extant source as a prior overlay network node, as indicated by a block 116.

Method 100 may continue as illustrated in FIG. 3, for each destination path, for each link in the destination path via native networking: posing a query whether there is a next link, as indicated by a query block 120. If there is not a next link, method 100 may proceed from query block 120 via a NO response line to pose a query whether the source is equal to the prior overlay network node, as indicated by a query block 124. If the source is not equal to the prior overlay network node, method 100 may proceed from query block 124 via a NO response line 130 and establish an overlay network link from the prior overlay network node to the destination, as indicated by a block 132. Method 100 may then proceed to block 104 to repeat steps represented by blocks 104, 106, 114, 116, 118, 120, 124, 132 as appropriate. If the source is equal to the prior overlay network node, method 100 may proceed from query block 124 via a YES response line 126 and establish an overlay network from source to destination, as indicated by a block 128. Method 100 may then proceed to block 104 to repeat steps represented by blocks 104, 106, 114, 116, 118, 120, 124, 132 as appropriate.

If there is a next link, method 100 proceeds from query block 120 via a YES response line 134 to set a current link equal to the next link, as indicated by a block 136. Method 100 may continue with retrieving current link performance characteristics, as indicated by a block 138.

Method 100 may continue with posing a query whether the current link performance link characteristics are acceptable, as indicated by a query block 140. If the current link performance characteristics are acceptable, method 100 may proceed from query block 140 via a YES response line 142 to block 118. Method 100 may then proceed to repeat steps represented by blocks 118, 120, 124, 132, 128, 136, 138, 140 as appropriate. If the current link performance characteristics are not acceptable, method 100 may proceed from query block 140 via a NO response line 144 to establish an overlay network link from the prior overlay network node to the start of the current link, as indicated by a block 118. Method 100 may continue with setting the prior overlay network node to a node where the current link starts, as indicated by a lock 148. Method 100 may continue with establishing an overlay network link from the prior overlay network node to the end of the current link, as indicated by a block 150. Method 100 may continue with setting the prior overlay network node to a node where the current link ends, as indicated by a block 152. Method 100 may then proceed to block 118 and may repeat steps represented by blocks 118, 120, 124, 132, 128, 136, 138, 140, 146, 148, 150, 152 as appropriate.

The algorithm for overlay network link establishment exemplified in method 100 (FIG. 3) may be executed by NTM units 34, 44 (FIG. 2) to determine and configure the links and paths or routes for BCS units 39, 49 (FIG. 2) within the particular node may be represented. The illustrated NTM process may ensure that all nodes within a given tactical network maintain a common view of the network's tactical or edge network topology, communication performance for all the links on the native network, and paths or routes on the native network. This arrangement may imply that all edge network nodes $22_1, 22_2$ (FIG. 2) within a tactical network may be similar to the native network and may independently determine and configure the specific links from a particular node and its adjacent BCS overlay nodes based on the known paths or routes on the native networking and the characteristics of communication performance of the links on the native network.

The BCS overlay network paths or routes establishment may assume substantially the same paths or routes between given source and destination node pairs and accordingly the NTM may also configure the paths or routes associated with the BCS overlay network within its node. An alternative solution for paths or routes establishments for the BCS overlay network following the configuration of specific overlay network links from a particular node and its adjacent BCS overlay nodes may be to use a Dijkstra OSPF algorithm to determine and configure the BCS overlay paths or routes. Such a distributed process of establishing and configuring BCS overlay network links and paths or routes within each node in a given tactical network may be independently performed by all tactical networks. Since each tactical network may interface with other tactical networks via the tactical gateway (e.g., gateway-capable edge network node 24; FIG. 2), an NTM unit (e.g. NTM units 34, 44; FIG. 2) may be required to maintain the link state on only the tactical network to which it may belong and maintain the address of its tactical gateway (e.g., gateway-capable edge network node 24; FIG. 2) making the links and paths or routes establishment process for both native and overlay networking scalable. Such a distributed process may permit nodes from one tactical network to interconnect with nodes in other tactical networks and ex-system networks using the hierarchical network architecture defined by tactical gateways across large networks.

Figure 4:
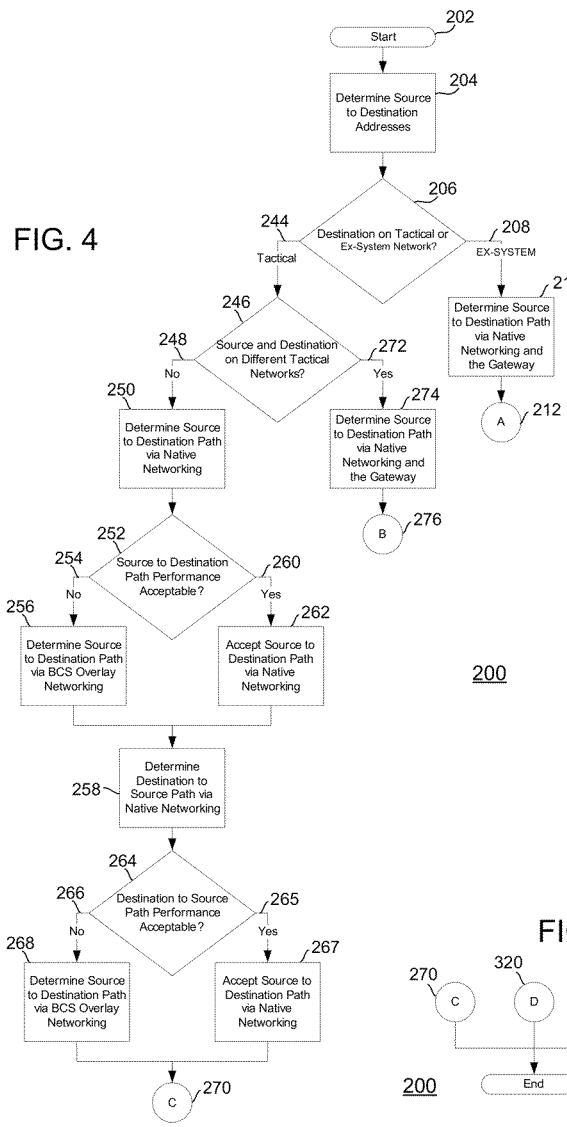
FIG. 4 is a flow diagram illustrating portions of a method for effecting path or route selection.
Figure 5:
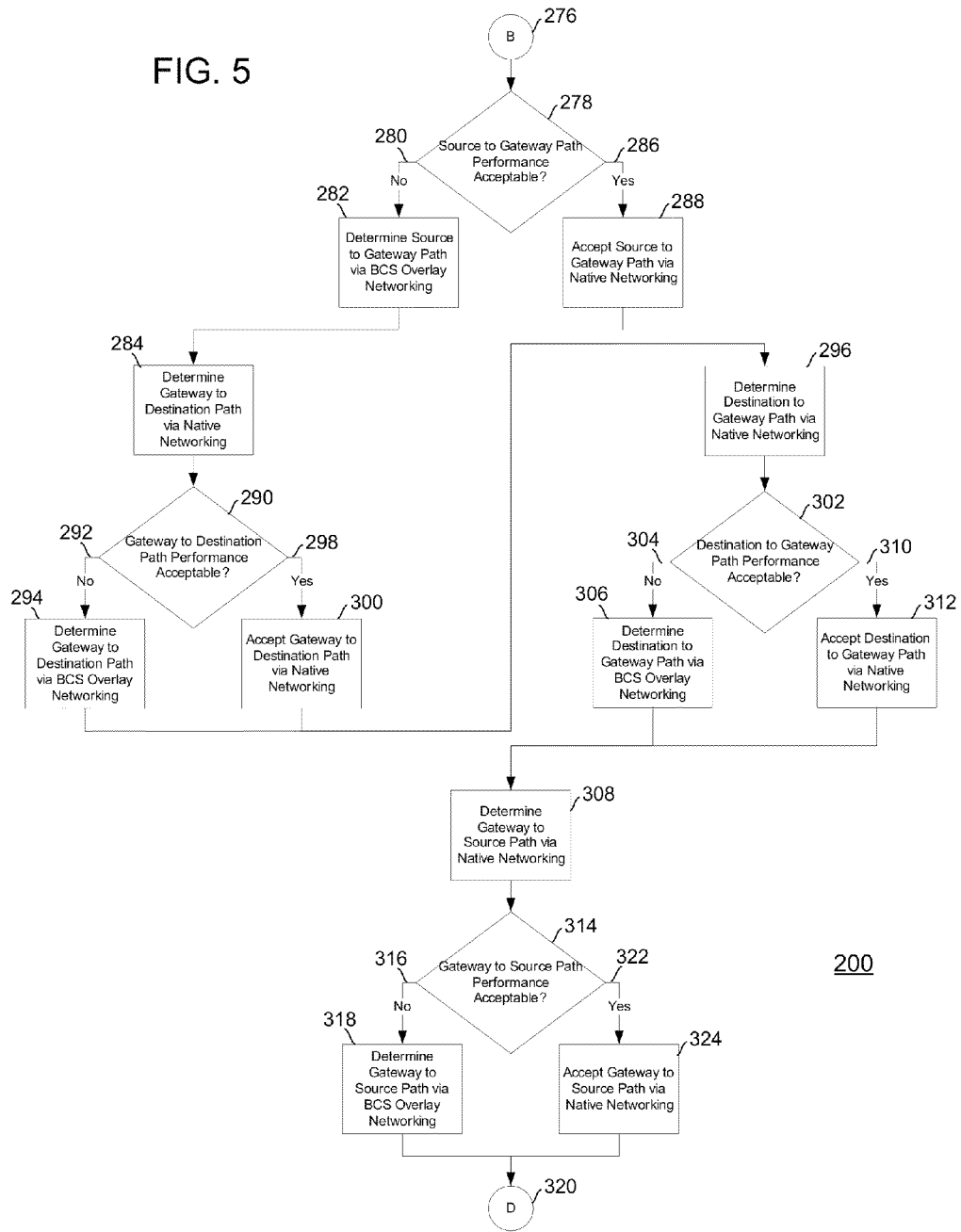
FIG. 5 is a flow chart illustrating further portions of the method for effecting path or route selection illustrated in FIG. 4.
Figure 6:
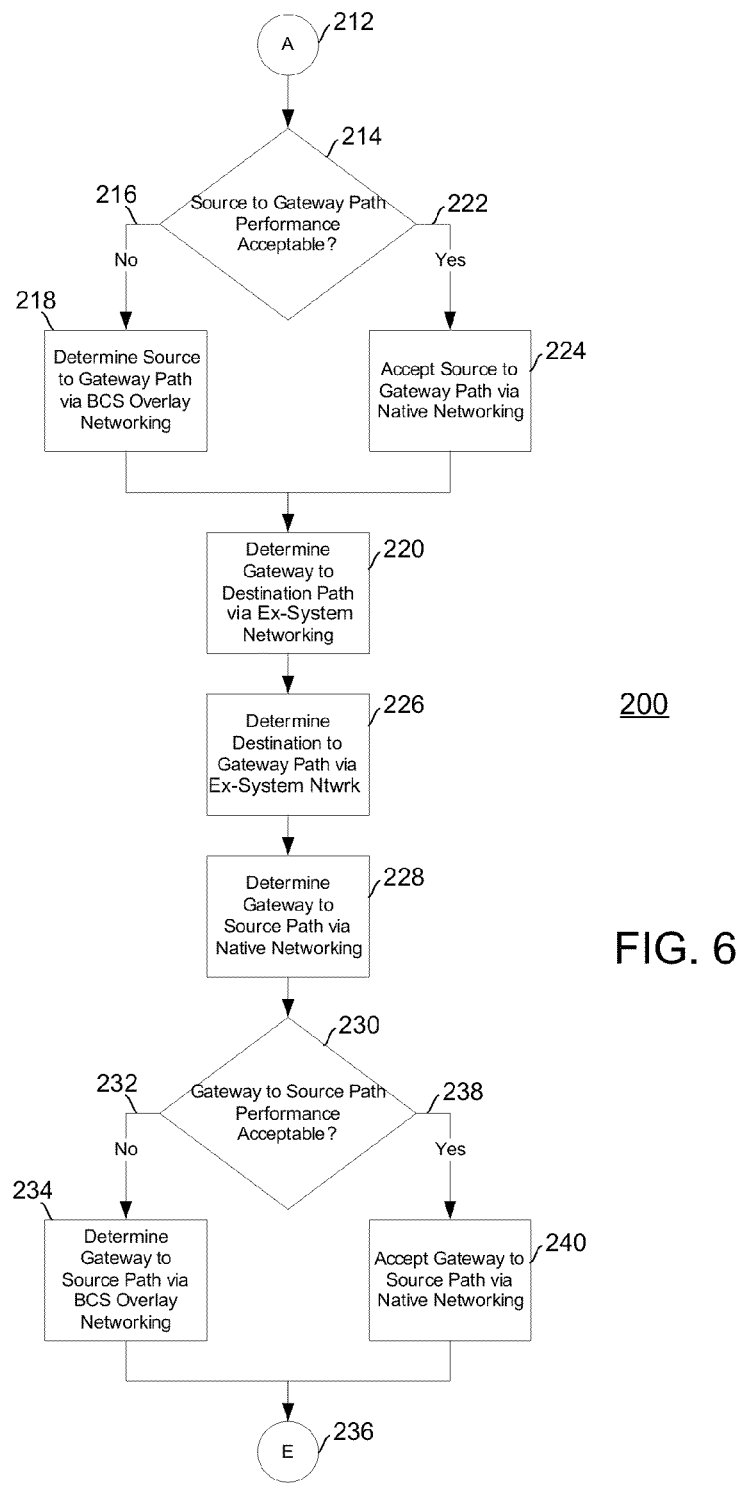
FIG. 6 is a flow chart illustrating still further portions of the method for effecting path or route selection illustrated in FIGS. 4-5.

FIG. 4 is a flow diagram illustrating portions of a method for effecting path or route selection. FIG. 5 is a flow chart illustrating further portions of the method for effecting path or route selection illustrated in FIG. 4. FIG. 6 is a flow chart illustrating still further portions of the method for effecting path or route selection illustrated in FIGS. 4-5. FIG. 7 is a flow chart illustrating certain relationships among FIGS. 4-6. Regarding FIGS. 4-7 together, a method 200 for effecting path or route selection may begin at a START locus 202 (FIG. 4). Method 200 may continue with determining source-to-destination addresses, as indicated by a block 204.

Method 200 may continue with posing a query whether the destination is located on a tactical network or an ex-system network, as indicated by a query block 206. If the destination is located on an ex-system network, system 200 may proceed from query block 206 via an EX-SYSTEM response line 208 to determine a source-to-destination path via native networking and a gateway, as indicated by a block 210. Method 200 may continue to a locus "A" indicated by a reference numeral 212.

Method 200 may proceed from locus "A" 212 (FIG. 6) by posing a query whether the source-to-gateway path performance is acceptable, as indicated by a query block 214. If the source-to-gateway path performance is not acceptable, method 200 may proceed from query block 214 via a NO response line 216 to determine a source-to-gateway path via BCS (Bundled Communications Service) unit (see FIG. 2) overlay networking, as indicated by a block 218. If the source-to-gateway path performance is acceptable, method 200 may proceed from query block 214 via a YES response line 222 to accept the source-to-gateway path via native networking, as indicated by a block 224. Method 200 may continue from either of blocks 218, 224 to determine a gateway-to-destination path via ex-system networking, as indicated by a block 220. Method 200 may continue with determining a destination-to-gateway path via ex-system networking, as indicated by a block 226. Method 200 may continue with determining a gateway-to-source path via native networking, as indicated by a block 228.

Method 200 may continue with posing a query whether the gateway-to-source path performance is acceptable, as indicated by a query block 230. If the gateway-to-source path performance is not acceptable, method 200 may proceed from query block 230 via a NO response line 232 and determine a gateway-to-source path via BCS overlay networking, as indicated by a block 234. If the gateway-to-source path performance is acceptable, method 200 may proceed from query block 230 via a YES response line 238 to accept the gateway-to-source path via native networking, as indicated by a block 240. Method 200 may proceed from either of blocks 234, 240 to a locus "E" indicated by a reference numeral 236.

Method 200 may proceed from locus "E" 236 (FIG. 7) to terminate at an END locus 242.

Returning to FIG. 4, if the destination is located on a tactical network, method 200 may proceed from query block 206 via a TACTICAL response line 244 to pose a query whether the source and destination are located on different tactical networks, as indicated by a query block 246.

If the source and destination are not located on different networks, method 200 may proceed from query block 246 via a NO response line 248 to determine a source-to-destination path via native networking, as indicated by a block 250. Method 200 may continue by posing a query whether the source-to-destination path performance is acceptable, as indicated by a query block 252. If the source-to-destination path performance is not acceptable, method 200 may proceed from query block 252 via a NO response line 254 to determine a source-to-destination path via BCS overlay networking, as indicated by a block 256. If the source-to-destination path performance is acceptable, method 200 may proceed from query block 252 via a YES response line 260 to accept the source-to-destination path via native networking, as indicated by a block 262.

Method 200 may proceed from either of blocks 256, 262 to determine a destination-to-source path via native networking, as indicated by a block 258.

Method 200 may continue with posing a query whether the destination-to-source path performance is acceptable, as indicated by a query block 264. If the destination-to-source path performance is not acceptable, method 200 may proceed from query block 264 via NO response line 266 and determine a source-to-destination path via BCS overlay networking, as indicated by a block 268. If the destination-to-source path performance is acceptable, method 200 may proceed from query block 264 via a YES response line 265 and accept the source-to-destination path via native networking, as indicated by a block 267.

Method 200 may proceed from either of blocks 268, 267 to a locus "C" indicated by a reference numeral 270.

Method 200 may proceed from locus "C" 270 (FIG. 7) to terminate at an END locus 242.

If the source and destination are located on different networks, method 200 may proceed from query block 246 via a YES response line 272 to determine a source-to-destination path via native networking and a gateway, as indicated by a block 274. Method 200 may proceed from block 274 to a locus "B" indicated by a reference numeral 276.

Method 200 may proceed from locus "B" 276 (FIG. 5) to pose a query whether the source-to-gateway path performance is acceptable, as indicated by a query block 278. If the source-to-gateway path performance is not acceptable, method 200 may proceed from query block 278 via a NO response line 280 to determine a source-to-gateway path via BCS overlay networking, as indicated by a block 282. If the source-to-gateway path performance is acceptable, method 200 may proceed from query block 278 via a YES response line 286 to accept the source-to-gateway path via native networking, as indicated by a block 288. Method 200 may proceed on either of blocks 282, 288 to determine a gateway-to-destination path via native networking, as indicated by a block 284.

Method 200 may continue with posing a query whether the gateway-to-destination path performance is acceptable, as indicated a query block 290. If the gateway-to-destination path performance is not acceptable, method 200 may proceed from query block 290 via a NO response line 292 to determine a gateway-to-destination path via BCS overlay networking, as indicated by a block 294. If the gateway-to-destination path performance is acceptable, method 200 may proceed from query block 290 via a YES response line 298 to accept the gateway-to-destination path via native networking, as indicated by a block 300. Method 200 may continue with determining a destination-to-gateway path via native networking, as indicated by a block 296.

Method 200 may continue with posing a query whether the destination-to-gateway path performance is acceptable, as indicated by a query block 302. If the destination-to-gateway path performance is not acceptable, method 200 may proceed from query block 302 via a NO response line 304 to determine a destination-to-gateway path via BCS overlay networking, as indicated by a block 306. If the destination-to-gateway path performance is acceptable, method 200 may proceed from query block 302 via a YES response line 310 to accept the destination-to-gateway path via native networking, as indicated by a block 312. Method 200 may proceed from either of blocks 306, 312 to determine a gateway-to-source path via native networking, as indicated by a block 308.

Method 200 may continue by posing a query either the gateway-to-source path performance is acceptable, as indicated by a query block 314. If the gateway-to-source path performance is not acceptable, method 200 may proceed from query block 314 via a NO response line 316 to determine a gateway-to-source path via BCS overlay networking, as indicated by a block 318. If the gateway-to-source path performance is acceptable method 200 may proceed from query block 314 via a YES response line 322 to accept the gateway-to-source path via native networking, as indicated by a block 324.

Method 200 may proceed from either of blocks 318, 324 to a locus "D" indicated by a reference numeral 320.

Method 200 may proceed from locus "D" 320 (FIG. 7) to terminate at an END locus 242.

D3S 36, 46 (FIG. 2) may receive a request for the establishment of a session from the given source to destination nodes from the Application Network Service (ANS) 33, 43 in the source node 22$_1$, 22$_2$ (FIG. 2). D3S 36, 46 in conjunction with NTM 34, 44 (FIG. 2) may determine the path route for the particular session. FIGS. 5-7 describe an algorithm that may be used by NTM 34, 44 to determine the network path or route between source and destination nodes. As illustrated in FIG. 4, NTM 34, 44 (FIG. 2) may first determine the addresses of the source and destination nodes followed by whether the destination node is on the tactical or an ex-system network. Similarly if the destination node is on tactical network, NTM 34, 44 (FIG. 2) may determine whether it is on the same tactical network as the source or on a different tactical network. If the destination node is on an ex-system network or another tactical network then NTM 34, 44 (FIG. 2) may establish the path or route for the session from the particular source node to tactical gateway 24 (FIG. 2). Tactical gateway 24 may in turn continue to establish the path or route for the session from tactical gateway 24 to the destination node.

NTM 34, 44 within the source node 22$_1$, 22$_2$ may only establish the path or route within its tactical network, and paths or routes beyond its tactical network may be managed at the next hierarchy by tactical gateway 24. NTM 34, 44 may further determine the network path or route to be taken by identifying whether the session should take the native networking or the BCS overlay networking path or route. Determination of which path or route should be taken for a particular session may be made by NTM 34, 44 based on whether Quality of Service (QoS) requirements of the session and native network communication link characteristics within the particular tactical network may be acceptable. Following this determination, NTM 34, 44 may communicate to D3S 36, 46 whether the session should be directed to tactical gateway 24 and whether native or the BCS overlay networking path or route should be taken. D3S 36, 46 and NTM 34, 44 within the tactical network may follow a similar process for the establishment of a path or route for the session from tactical gateway 24 to the destination node. When a destination node is on an ex-system network, tactical gateway 24 may forward the session to the ex-system network via its native networking, such as, by way of example and not by way of limitation, IP networking. When the destination node is on another tactical network, NTM 54 (FIG. 2) within tactical gateway 24 may determine which path or route to use for the particular session based on QoS requirements of the session and the native network communication link characteristics. NTM 54 within tactical gateway 24 may communicate to D3S 56 whether the session should take the native or the BCS overlay networking path or route to the destination node.

Figure 8:
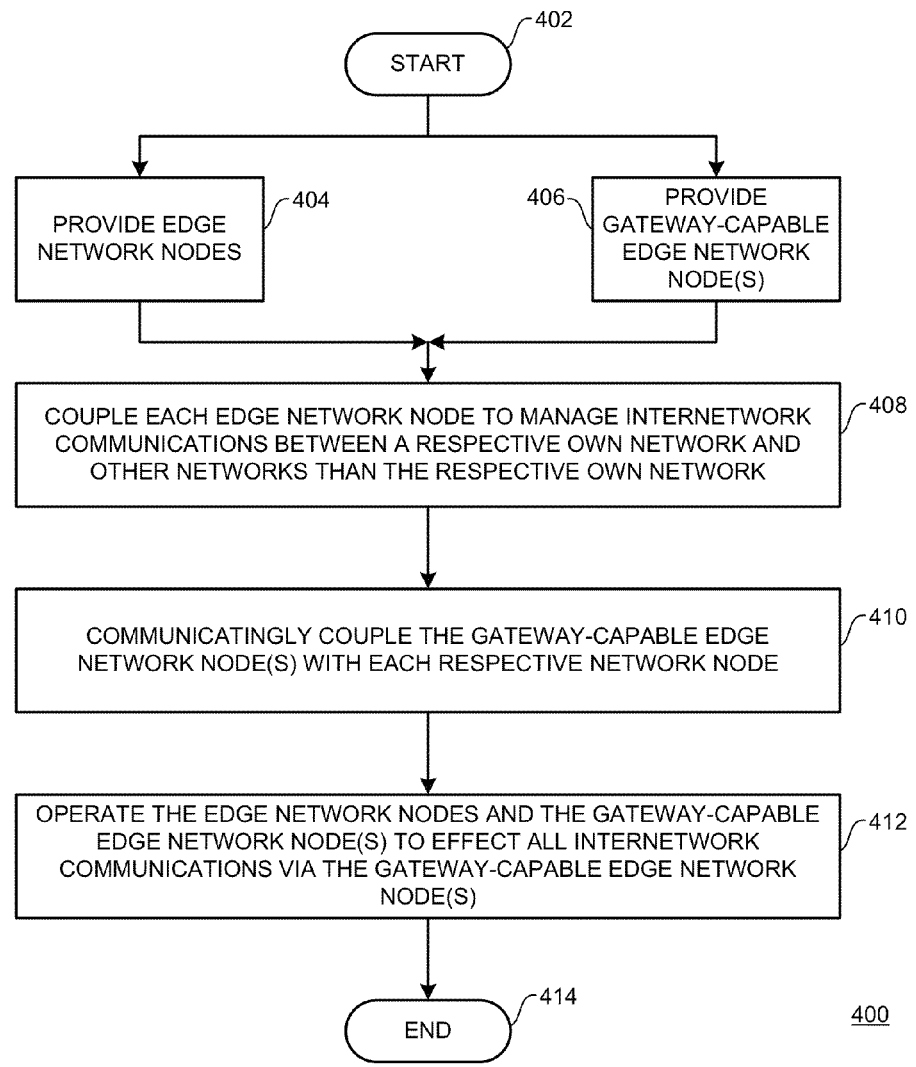
FIG. 8 is a flow chart illustrating the method of the present disclosure.

FIG. 8 is a flow chart illustrating the method of the present disclosure. In FIG. 8, a method 400 for managing internetwork communications among a plurality of networks may begin at a START locus 402.

Method 400 may continue with, in no particular order: (1) Providing a plurality of edge network nodes, as indicated by a block 404. Each respective edge network node may include a native communication network management unit for managing communications by the respective edge network node using a native communication protocol. Each respective edge network node may include an overlay communication network management unit for managing communications by the respective edge network node using an overlay communication protocol. (2) Providing at least one gateway-capable edge network node, as indicated by a block 406.

Method 400 may continue with coupling each respective edge network node of the plurality of edge network nodes to manage the internetwork communications between a respective own network and other networks of the plurality of networks than the respective own network, as indicated by a block 408.

Method 400 may continue with communicatingly coupling the at least one gateway-capable edge network node with each respective network node of the plurality of edge network nodes, as indicated by a block 410.

Method 400 may continue with operating the plurality of edge network nodes and the at least one gateway-capable node to effect all internetwork communications via the at least one gateway-capable edge network node, as indicated by a block 412. Method 400 may terminate at an END locus 414.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A system for effecting communication management among a plurality of networks and at least one ex-system network employing a plurality of communication protocols; the system comprising:
   a respective edge network node coupled to serve each respective network of said plurality of networks; each said respective edge network node and coupled respective network using a substantially same respective communication protocol of said plurality of communication protocols; each said respective network carrying out communications with addressees outside said respective network via said respective edge network node;
   a gateway-capable edge network node communicatingly coupled with each said respective edge network node and communicatingly coupled with said at least one ex-system network; said at least one ex-system network being coupled with each said respective network only via said gateway-capable edge network node; said gateway-capable edge network node being configured for handling communications in each respective communication protocol of said plurality of communication protocols; said gateway-capable edge network node being configured for handling communications in appropriate communication protocols used by said at least one ex-system network; said plurality of networks communicating with each other via said gateway-capable edge network node; each said respective network communicating with said at least one ex-system network via said gateway-capable edge network node, wherein said gateway-capable edge network node is configured to obtain topology information using distributed node discovery mechanisms in a native networking protocol stack and compile and transmit the topology information to at least one said respective edge network node.

2. A system for effecting communication management among a plurality of networks and at least one ex-system network employing a plurality of communication protocols as recited in claim 1 wherein each said respective edge network node includes a respective native protocol unit for effecting communication using a respective native communication protocol, and wherein said gateway-capable edge network includes at least one native gateway communication protocol unit for effecting communication with each said respective edge network node using a respective native communication protocol of said respective edge network node.

3. A system for effecting communication management among a plurality of networks and at least one ex-system network employing a plurality of communication protocols as recited in claim 2 wherein each said respective edge network node includes a respective network topology management unit coupled with said respective native protocol unit for managing topological aspects of communication by said respective edge network node using said respective native communication protocol, and wherein said gateway-capable edge network node includes at least one gateway network topology management unit for managing topological aspects of communication by said gateway-capable edge network node.

4. A system for effecting communication management among a plurality of networks and at least one ex-system network employing a plurality of communication protocols as recited in claim 3 wherein each said respective edge network node includes a respective overlay network management unit coupled with said respective native protocol unit for managing overlay network communication operations by said respective edge network node using at least one respective overlay communication protocol.

5. A system for effecting communication management among a plurality of networks and at least one ex-system network employing a plurality of communication protocols as recited in claim 4 wherein said gateway-capable edge network node includes a gateway overlay network management unit coupled with said at least one native gateway communication protocol unit for managing overlay network communication operations by said gateway-capable edge network node using at least one respective overlay communication protocol.

6. A system for effecting communication management among a plurality of networks and at least one ex-system network employing a plurality of communication protocols as recited in claim 5 wherein each said respective edge network node includes a respective data dissemination unit coupled with said respective native network management unit and coupled with said respective overlay network management unit; said respective data dissemination unit cooperating with said respective native network management unit to effect said communication using said respective native communication protocol; said respective data dissemination unit cooperating with said respective overlay network management unit to effect said communication using said respective overlay communication protocol.

7. A system for effecting communication management among a plurality of networks and at least one ex-system network employing a plurality of communication protocols as recited in claim 6 wherein each said respective edge network node includes at least one node-specific application network services management unit for managing communications specific to at least one particular application operated by said respective edge network node, and wherein said gateway-capable edge network node includes a proxy application managing unit coupled with said at least one node-specific application network services management unit for managing communications specific to at least one particular application operated by each said respective edge network node.

8. A system for managing internetwork communications among a plurality of networks; the system comprising:
   a plurality of edge network nodes; each respective edge network node of said plurality of edge network nodes being coupled to manage said internetwork communications between a respective own network and other networks of said plurality of networks than said respective own network; and
   at least one gateway-capable edge network node communicatingly coupled with each said respective network node of said plurality of edge network nodes;
   each said respective edge network node including a native communication network management unit for managing communications by said respective edge network node using a respective native communication protocol; each said respective edge network node including a respective overlay communication network management unit for managing communications by said respective edge network node using a respective overlay communication protocol; each respective gateway-capable edge network node of said at least one gateway-capable edge network node being configured for communicating using said respective native communication protocol for each said respective edge network node; each said respective gateway-capable edge network node being configured for communication using a respective gateway-capable edge network node overlay communication protocol; each said respective gateway-capable edge network node being configured for effecting communications between each said respective edge network node and an ex-system network coupled with each said respective edge network node only by a respective gateway-capable edge network node; said internetwork communications being carried out among said plurality of networks via said at least one gateway-capable edge network node; said internetwork communications being carried out among said plurality of networks and said at least one ex-system network via said at least one gateway-capable edge network node, wherein said at least one gateway-capable edge network node is configured to obtain topology information using distributed node discovery mechanisms in a native networking protocol stack and compile and transmit the topology information to at least one said respective edge network node.

9. The system for managing internetwork communications among a plurality of networks as recited in claim 8 wherein each said respective edge network node includes a respective node-specific application network services management unit for managing communications specific to at least one particular application operated by said respective edge network node.

10. The system for managing internetwork communications among a plurality of networks as recited in claim 9 wherein each respective gateway-capable edge network node of said at least one gateway-capable edge network node includes a gateway-capable native communication network management unit for managing communications by said respective gateway-capable edge network node using a native communication protocol; each said respective gateway-capable edge network node including a gateway-capable overlay communication network management unit for managing communications by said respective gateway-capable edge network node using an overlay communication protocol.

11. The system for managing internetwork communications among a plurality of networks as recited in claim 8 wherein each said respective edge network node includes at least one node-specific application network services management unit for managing communications specific to at least one particular application operated by said respective edge network node.

12. The system for managing internetwork communications among a plurality of networks as recited in claim 8 wherein said gateway-capable edge network node includes a proxy application managing unit coupled with said at least one node-specific application network services management unit for managing communications specific to at least one particular application operated by each said respective edge network node.

13. The system for managing internetwork communications among a plurality of networks as recited in claim 9 wherein said gateway-capable edge network node includes a proxy application managing unit coupled with said at least one node-specific application network services management unit for managing communications specific to at least one particular application operated by said respective edge network node.

14. The system for managing internetwork communications among a plurality of networks as recited in claim 11 wherein each respective gateway-capable edge network node of said at least one gateway-capable edge network node includes a gateway-capable native communication network management unit for managing communications by said respective gateway-capable edge network node using a native communication protocol; each said respective gateway-capable edge network node including a gateway-capable overlay communication network management unit for managing communications by said respective gateway-capable edge network node using an overlay communication protocol.

15. The system for managing internetwork communications among a plurality of networks as recited in claim 14 wherein said gateway-capable edge network node includes a proxy application managing unit coupled with said at least one node-specific application network services management unit for managing communications specific to at least one particular application operated by each said respective edge network node.

16. A method for managing internetwork communications among a plurality of networks; the method comprising:
(a) in no particular order:
(1) providing a plurality of edge network nodes; each said respective edge network node including a native communication network management unit for managing communications by said respective edge network node using a native communication protocol; each said respective edge network node including an overlay communication network management unit for managing communications by said respective edge network node using an overlay communication protocol; and
(2) providing at least one gateway-capable edge network node configured to obtain topology information using distributed node discovery mechanisms in a native networking protocol stack and compile and transmit the topology information to at least one of the plurality of edge network nodes;
(b) coupling each respective edge network node of said plurality of edge network nodes to manage said internetwork communications between a respective own network and other networks of said plurality of networks than said respective own network; and
(c) communicatingly coupling said at least one gateway-capable edge network node with each said respective network node of said plurality of edge network nodes; and
(d) operating said plurality of edge network nodes and said at least one gateway-capable node to effect all said internetwork communications via said at least one gateway-capable edge network node;
each said respective edge network node including a native communication network management unit for managing communications by said respective edge network node using a respective native communication protocol; each said respective edge network node including a respective overlay communication network management unit for managing communications by said respective edge network node using a respective overlay communication protocol; each respective gateway-capable edge network node of said at least one gateway-capable edge network node being configured for communicating using said respective native communication protocol for each said respective edge network node; each said respective gateway-capable edge network node being configured for communication using a respective gateway-capable edge network node overlay communication protocol; each said respective gateway-capable edge network node being configured for effecting communications between each said respective edge network node and an ex-system network coupled with each said respective edge network node only by a respective gateway-capable edge network node; said internetwork communications being carried out among said plurality of networks via said at least one gateway-capable edge network node; said internetwork communications being carried out among said plurality of networks and said at least one ex-system network via said at least one gateway-capable edge network node.

17. The method for managing internetwork communications among a plurality of networks as recited in claim 16 wherein each said respective edge network node includes at least one node-specific application network services management unit for managing communications specific to at least one particular application operated by said respective edge network node.

18. The method for managing internetwork communications among a plurality of networks as recited in claim 17 wherein said each respective gateway-capable edge network node of said at least one gateway-capable edge network node includes a proxy application managing unit coupled with said at least one node-specific application network services management unit for managing communications specific to at least one particular application operated by each said respective edge network node.

* * * * *